US010204276B2

(12) United States Patent
Atsumi

(10) Patent No.: US 10,204,276 B2
(45) Date of Patent: Feb. 12, 2019

(54) IMAGING DEVICE, METHOD AND RECORDING MEDIUM FOR CAPTURING A THREE-DIMENSIONAL FIELD OF VIEW

(71) Applicant: CASIO COMPUTER CO., LTD., Shibuya-ku, Tokyo (JP)

(72) Inventor: Hiroki Atsumi, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 172 days.

(21) Appl. No.: 14/975,186

(22) Filed: Dec. 18, 2015

(65) Prior Publication Data
US 2016/0255331 A1 Sep. 1, 2016

(30) Foreign Application Priority Data

Feb. 26, 2015 (JP) .................... 2015-036003

(51) Int. Cl.
G06K 9/00 (2006.01)
G06K 9/20 (2006.01)
(52) U.S. Cl.
CPC ..... G06K 9/00791 (2013.01); G06K 9/00818 (2013.01); G06K 9/00798 (2013.01); G06K 9/209 (2013.01)
(58) Field of Classification Search
CPC ............... B60R 1/00; B60R 2300/105; B60R 2300/106; B60R 2300/107; B60R 2300/205; B60R 2300/207; B60R 2300/303; B60R 2300/305; B60R 2300/802; B60R 2300/804; B60R 2300/8053; B60R 2300/806; H04N 7/18; H04N 7/181
See application file for complete search history.

(56) References Cited

U.S. PATENT DOCUMENTS 6,850,629 B2 * 2/2005 Jeon ........................ G06T 7/64
340/934
7,023,464 B1 * 4/2006 Harada .................. H04N 7/141
348/14.01
7,940,301 B2 5/2011 Kinoshita
(Continued)

FOREIGN PATENT DOCUMENTS

JP 2003097914 A 4/2003
JP 2003169233 A 6/2003
(Continued)

OTHER PUBLICATIONS

Japanese Office Action dated Nov. 27, 2018 (and English translation thereof) issued in counterpart Japanese Application No. 2015-036003.

Primary Examiner — Frank F Huang
(74) Attorney, Agent, or Firm — Holtz, Holtz & Volek PC

(57) ABSTRACT

An imaging device includes a first imaging section, a second imaging section and an image data acquiring section. The first imaging section includes a first lens. The second imaging section includes a second lens. The second lens has an angle of view wider than the first lens. The image data acquiring section acquires first image data of a subject captured by the first imaging section, second image data of the subject captured by the second imaging section, and a pair of image data having parallax based on the first image data and the second image data.

17 Claims, 7 Drawing Sheets

(56) References Cited

U.S. PATENT DOCUMENTS

| | | | | |
|---|---|---|---|---|
| 8,159,519 B2* | 4/2012 | Kurtz | ............... | H04N 7/147 |
| | | | | 348/14.01 |
| 8,381,985 B2* | 2/2013 | Ferren | ............. | G02B 13/0065 |
| | | | | 235/462.21 |
| 8,908,041 B2* | 12/2014 | Stein | ............. | G06K 9/00791 |
| | | | | 348/148 |
| 9,618,746 B2* | 4/2017 | Browne | ............ | G02B 27/017 |
| 9,674,490 B2* | 6/2017 | Koravadi | ............ | H04N 7/181 |
| 9,727,790 B1* | 8/2017 | Vaziri | ............. | G06K 9/00771 |
| 9,779,311 B2* | 10/2017 | Lee | ............. | G08G 1/017 |
| 2003/0122930 A1* | 7/2003 | Schofield | ........... | B60R 1/00 |
| | | | | 348/148 |
| 2012/0257005 A1* | 10/2012 | Browne | ............ | G02B 27/017 |
| | | | | 348/36 |
| 2014/0313335 A1* | 10/2014 | Koravadi | ............ | H04N 7/181 |
| | | | | 348/148 |
| 2016/0179093 A1* | 6/2016 | Prokhorov | ............ | B60W 40/00 |
| | | | | 701/2 |

FOREIGN PATENT DOCUMENTS

| | | | |
|---|---|---|---|
| JP | 2003329464 A | 11/2003 |
| JP | 2005196276 A | 7/2005 |
| JP | 2005300342 A | 10/2005 |
| JP | 2005352705 A | 12/2005 |
| JP | 3952790 B2 | 8/2007 |
| JP | 2010210690 A | 9/2010 |
| JP | 2011174799 A | 9/2011 |
| JP | 2011204118 A | 10/2011 |
| JP | 2012165067 A | 8/2012 |
| WO | 2014054752 A1 | 4/2014 |

* cited by examiner

IMAGING DEVICE, METHOD AND RECORDING MEDIUM FOR CAPTURING A THREE-DIMENSIONAL FIELD OF VIEW

CROSS-REFERENCE TO RELATED APPLICATIONS

This application is based upon and claims the benefit of priority from the prior Japanese Patent Application No. 2015-036003, filed Feb. 26, 2015, the entire contents of which are incorporated herein by reference.

BACKGROUND OF THE INVENTION

1. Field of the Invention

The present invention relates to an imaging device, an imaging method, and a recording medium for capturing a three-dimensional field of view.

2. Description of the Related Art

An automatic movable object, such as an automobile, a vehicle or a robot, is required to constantly monitor its surroundings to run safely on a predetermined route and to recognize a stop plate or a sign board indicating a stop position in a forward direction to stop in front of the stop plate.

To achieve such requirements, automatic movable objects are provided with various types of cameras that enable automatic drive.

Japanese Patent Laid-Open Publication No. 2003-97914 discloses a stereo camera to detect a position of a moving subject, although the publication does not disclose an automatic movable object. The stereo camera captures a three-dimensional field of view and can determine a position of the subject or a distance thereto from a pair of acquired image data sets.

Japanese Patent Laid-Open Publication No. 2003-169233 discloses an automobile equipped with a wide-angle camera and a high-resolution camera. The automobile is configured to capture a wide field of view from the wide-angle camera and a high-resolution field of view from the high-resolution camera so that the automobile can run in accordance with surroundings or states on the road ahead of the automobile.

SUMMARY OF THE INVENTION

According to one aspect of the present invention, there is provided an imaging device including:
a first imaging section including a first lens;
a second imaging section including a second lens, the second lens having an angle of view wider than the first lens; and
an image data acquiring section acquiring first image data of a subject captured by the first imaging section, second image data of the subject captured by the second imaging section, and a pair of image data having parallax based on the first image data and the second image data.

According to another aspect of the present invention, there is provided an imaging method performed by an imaging device, the imaging method including:
acquiring first image data of a subject and second image data of the subject, the first image data being captured by a first imaging section having a first lens, the second image data being captured by a second imaging section having a second lens, the second lens having a wider angle of view than the first lens; and
acquiring a pair of image data having parallax based on the first image data of the subject captured by the first imaging section and the second image data of the subject captured by the second imaging section.

According to another aspect of the present invention there is provided a non-transitory computer-readable recording medium containing a program that causes a computer to implement an imaging method in an imaging device,
wherein the recording medium causes the computer to perform the following steps of:
acquiring first image data of a subject and second image data of the subject, the first image data being captured by a first imaging section having a first lens, the second image data being captured by a second imaging section having a second lens, the second lens having a wider angle of view than the first lens; and
acquiring a pair of image data having parallax based on the first image data of the subject captured by the first imaging section and the second image data of the subject captured by the second imaging section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
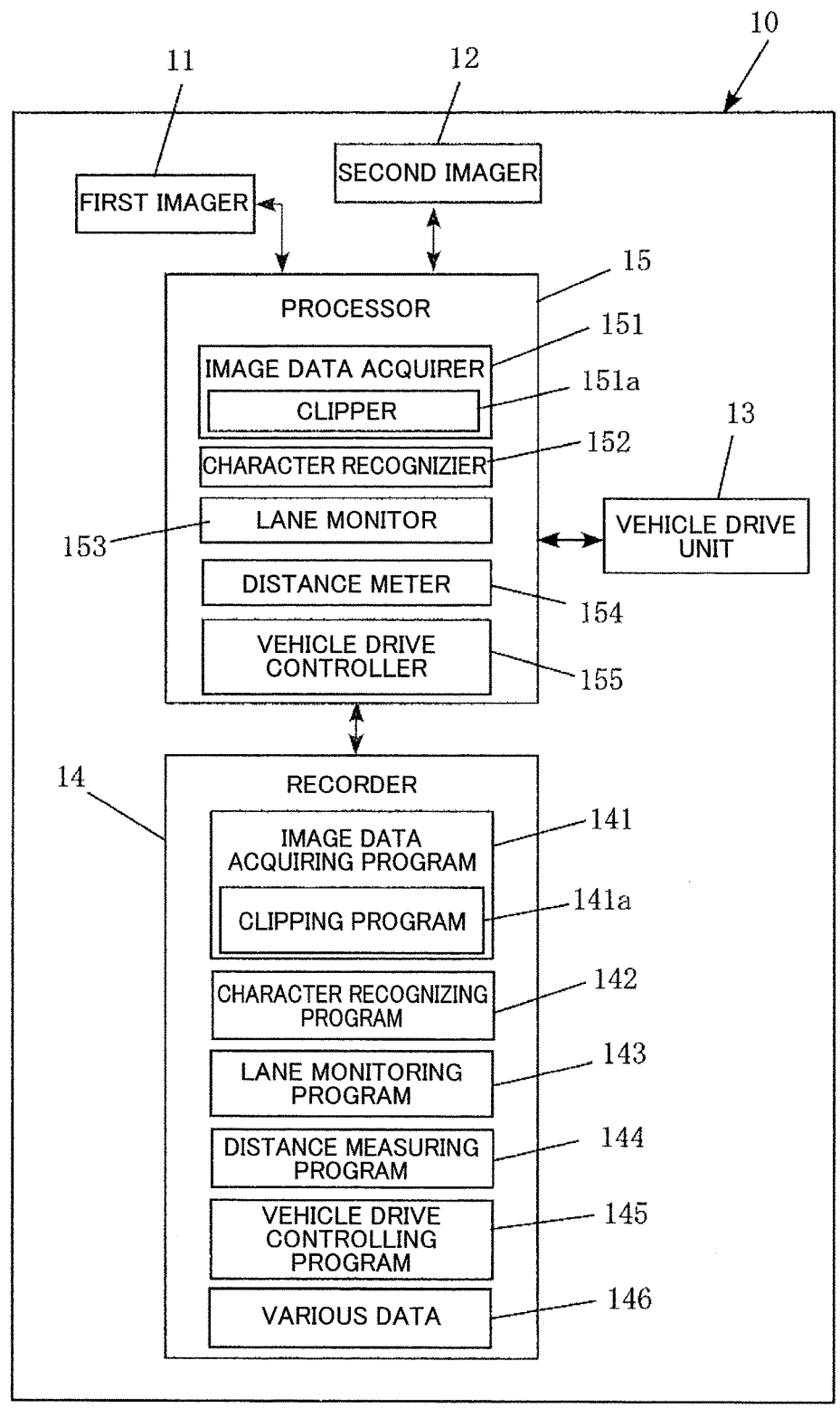
FIG. 1 is a block diagram illustrating control of an on-board device including an imaging unit according to the present invention.

With reference to FIGS. 1 to 9, one embodiment of the present invention will now be described. In the following description and drawings, the same reference numerals are assigned to the same elements without redundant description.

[Configuration]

FIG. 1 is a block diagram illustrating a functional configuration of an on-board device in an automated driving vehicle. As shown FIG. 1, the on-board device 10 includes a first imager 11, a second imager 12, a vehicle drive unit 13, a recorder 14, and a processor 15. The first imager 11 is a first imaging section and the second imager 12 is a second imaging section.

The on-board device 10 may include an input unit, a display unit, or both, although not shown in FIG. 1. The input unit is equipped with an input system, such as a touch panel, a button or a switch, as appropriate, and outputs input signals that corresponds to entries to the processor 15. The display unit is equipped with a display system, such as LCD or EL display, and displays information corresponding to signals received from the processor 15. Alternatively, the on-board device 10 may be equipped with a communicating system for remote control.

Figure 9:
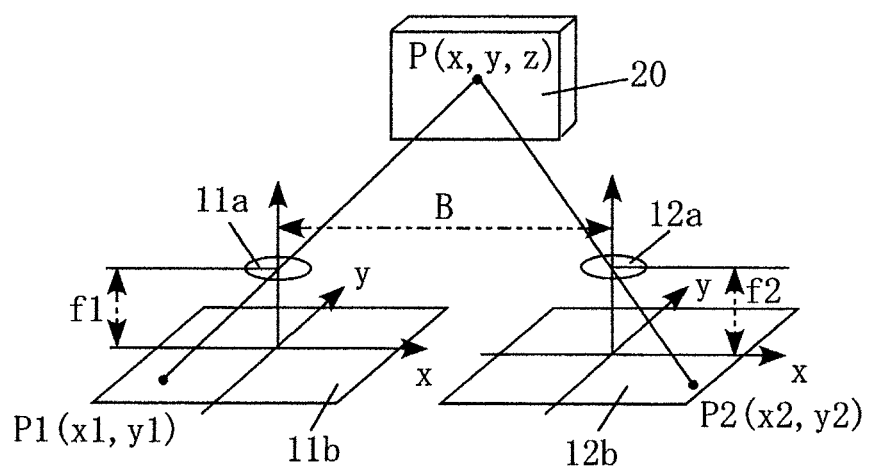
FIG. 9 is a schematic perspective view of a perspective projection model.

As shown in FIG. 9, the first imager 11 includes, for example, a first lens 11a and an image sensor 11b to generate and output the image data of a subject to the processor 15. The first lens 11a is a standard imaging lens and the image sensor 11b converts incident light from the first lens 11a into electric signals.

As shown in FIG. 9, the second imager 12 includes a second lens 12a and an image sensor 12b to generate and output the image data of the subject to the processor 15. The second lens 12a has a wider angle of view than the first lens and the image sensor 12b converts incident light from the second lens 12a into electric signals.

In this embodiment, the first imager 11 and the second imager 12 face a front and are placed substantially parallel to each other at the same level, although any other placement may be employed. In other words, the axis of the first imager 11 and that of the second imager 12 are parallel to each other in the front-back direction and are positioned at the same level. This arrangement is due to an epipolar constraint between the imager 11 and the imager 12; the substantially parallel arrangement necessitates only one-dimensional search in a horizontal direction during matching. The first imager 11 has higher definition than the second imager 12.

The recorder 14 may be equipped with IC memory, such as ROM (e.g., re-writable flash memory) or RAM, hard disk or an information recording medium, such as a memory card, and a reader. The recorder 14 is preloaded with programs that achieve various functions of the automated driving vehicle and data used during execution of the programs. The data is updated as needed or new data is temporarily stored during processing.

The recorder 14 includes, for example, an image data acquiring program 141, a character recognizing program 142, a lane monitoring program 143, a distance measuring program 144, a vehicle drive controlling program 145 and data 146 necessary to execute these programs. The image data acquiring program 141 includes a clipping program 141a, which partially clips image data from the second imager 12.

The image data acquiring program 141 retrieves image data from the first imager 11 and the second imager 12. More specifically, it concurrently or selectively retrieves image data from the first imager 11 and the second imager 12 or clips image data from the second imager 12. The image data acquiring program 141 binarizes image data from the first imager 11 and the second imager 12.

The character recognizing program 142 recognizes characters in image data from the first imager 11. For example, it recognizes a parking position number on a stop plate located at a position at which the automated driving vehicle should stop, a traffic sign, or any other character.

The lane monitoring program 143 monitors a lane based on image data from the second imager 12. For example, it monitors a lateral deviation of a running automated driving vehicle or an obstacle on the right or left side of the running vehicle.

The distance measuring program 144 calculates the position of a subject or a distance thereto based on image data from the first imager 11 and part of image data from the second imager 12.

The vehicle drive controlling program 145 generates a vehicle drive control signal based on the recognized characters, the monitored lanes, or the measured distance to control the driving of the automated driving vehicle.

The processor 15, for example, works in conjunction with the image data acquiring program 141, the character recognizing program 142, the lane monitoring program 143, the distance measuring program 144, or the vehicle drive controlling program 145 to function as an image data acquirer 151, a character recognizer 152, a lane monitor 153, a distance meter 154, or a vehicle drive controller 155, respectively. The image data acquirer 151 includes the clipper 151a, which partially clips image data from the second imager 12.

Figure 2:
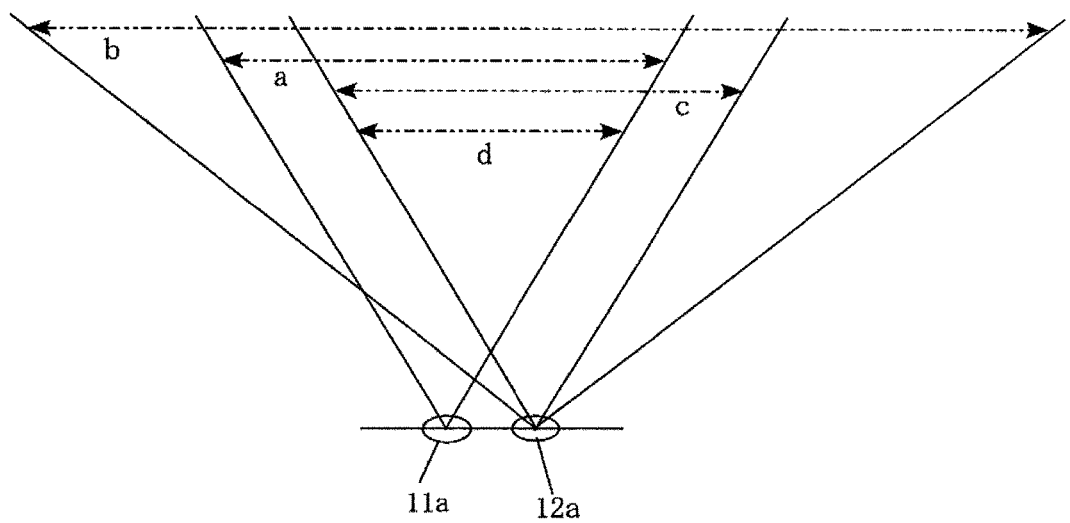
FIG. 2 is a plan view illustrating the fields of view captured by the imaging device.

FIG. 2 is a schematic diagram of fields of view captured by the imaging device according to this embodiment. The symbol "a" indicates a field of view captured by the first lens 11a of the first imager 11 (a high-definition field of view); the symbol "b" indicates a field of view captured by the second lens 12a of the second imager 12 (a wide-angle field of view); the symbol "c" indicates a field of view obtained by clipping of the field of view captured by the second lens 12a, and the symbol "d" indicates a field of view which is an intersection between the field of view "a" and the field of view "c" (a three-dimensional field of view). In this case, an angle of the field of view "a" is the same as that of the field of view "c", although different angles of field may be used. An angle of the field of view "b" of the second lens 12a includes that of the field of view "a" of the first lens 11a.

This embodiment employs the three fields of view of "a", "b", and "d" to control the driving of the automated driving vehicle. The drive control will now be described.

Figure 3:
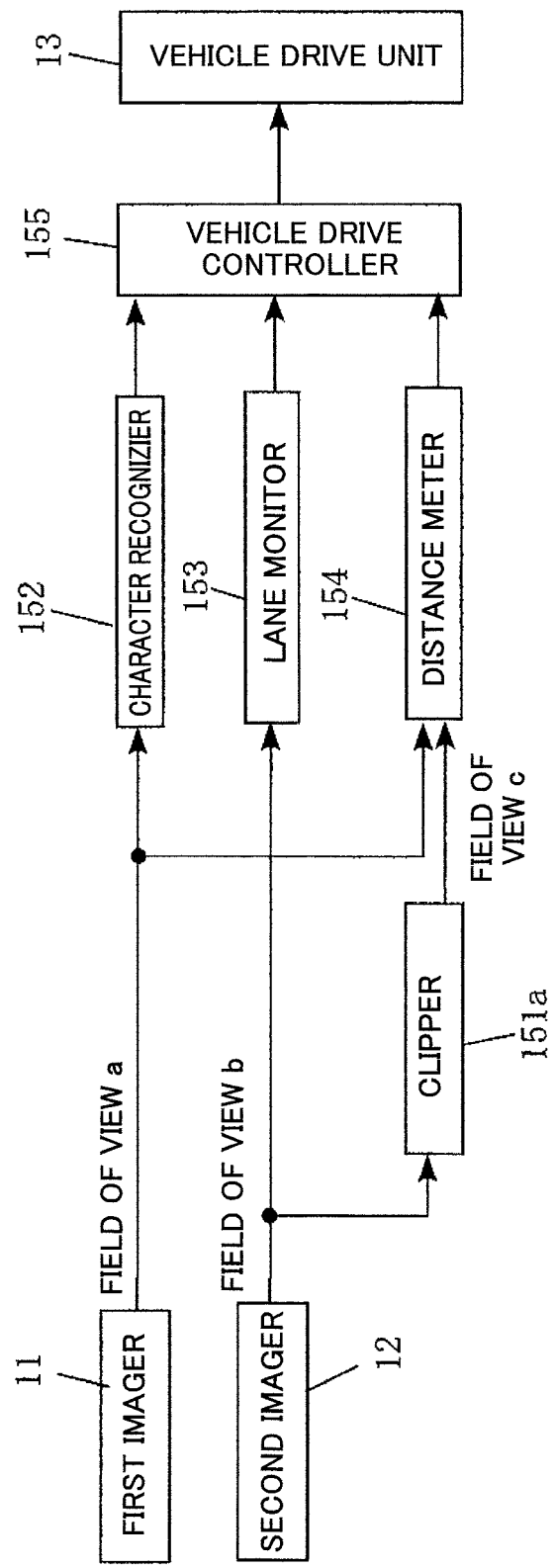
FIG. 3 is a block diagram illustrating a signal or a data flow of the on-board device in FIG. 1.

FIG. 3 illustrates a signal or a data flow of the on-board device 10 in FIG. 1.

As shown in FIG. 3, the image data acquirer 151 sends image data for the field of view "a" output from the first imager 11 to the character recognizer 152 and to the distance meter 154. The character recognizer 152 recognizes characters in the received image data and sends the recognized characters to the vehicle drive controller 155 to control the driving of the vehicle drive unit 13. The character recognizer 152 is a character recognizing section.

The image data acquirer 151 sends image data for the field of view "b" output from the second imager 12 to the lane monitor 153 and to the distance meter 154 via the clipper 151a. The clipper 151a extracts image data for the field of view "c" from image data for the field of view "b" and outputs the extracted image data for the field of view "c" to the distance meter 154. The lane monitor 153 recognizes the position of the vehicle relative to the lanes based on the received image data and sends the recognized position to the vehicle drive controller 155. The vehicle drive controller 155 controls the driving of the vehicle drive unit 13 based on the recognized position.

The distance meter 154 generates a pair of image data having parallax for the field of view "d" from the image data for the field of view "a" and the image data for the field of view "c", calculates the distance to the subject based on the pair of image data, sends the calculated distance to the vehicle drive controller 155. The vehicle drive controller 155 controls the driving of the vehicle drive unit 13 based on the calculated distance. Since the distance meter 154 generates (acquires) a pair of image data having parallax for the field of view "d" from the image data for the field of view "a" and the image data for the field of view "c", part of the distance meter 154 and the image data acquirer 151 together constitute an image data acquiring section. Alternatively, the image data acquirer 151 generates a pair of image data having parallax for the field of view "d" and then sends the image data to the distance meter 154.

The character recognizing process, the lane monitoring process and the distance measuring process will now be described along with the drive controlling process in an environment an automated driving vehicle actually encounters.

Figure 4:
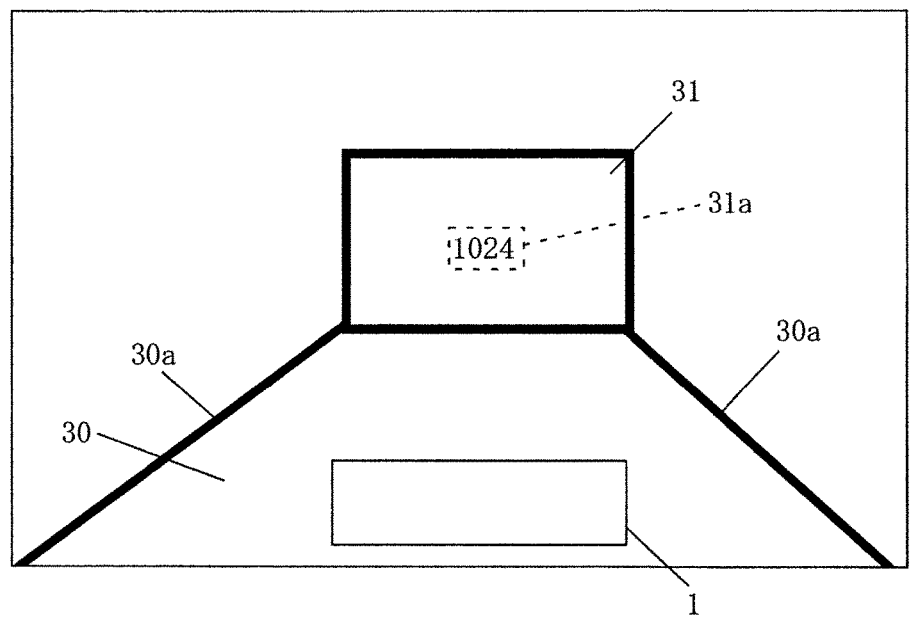
FIG. 4 is a schematic diagram illustrating a front view of an exemplary environment that the on-board device in FIG. 1 encounters.
Figure 5:
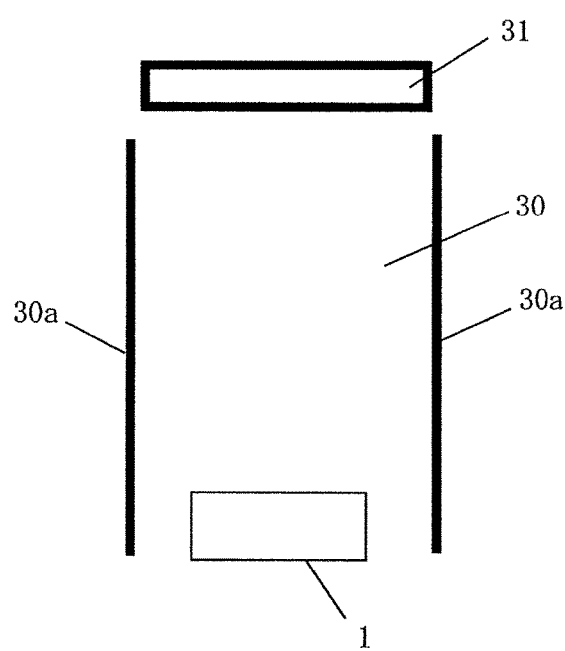
FIG. 5 is a schematic diagram illustrating a plan view of the environment in FIG. 4.

FIG. 4 is a front view of an exemplary environment that an automated driving vehicle encounters. FIG. 5 is a plan view of the environment.

In this environment, the automated driving vehicle 1 is on a lane 30 between lateral lane boundaries 30*a*, 30*a* and a stop plate 31 with a number "1024" indicating a stop position (stop position number 31*a*) is located in front of the vehicle.

The process of the processor 15 in such an environment will now be described.

(Character Recognizing Process and Drive Controlling Process)

Figure 6:
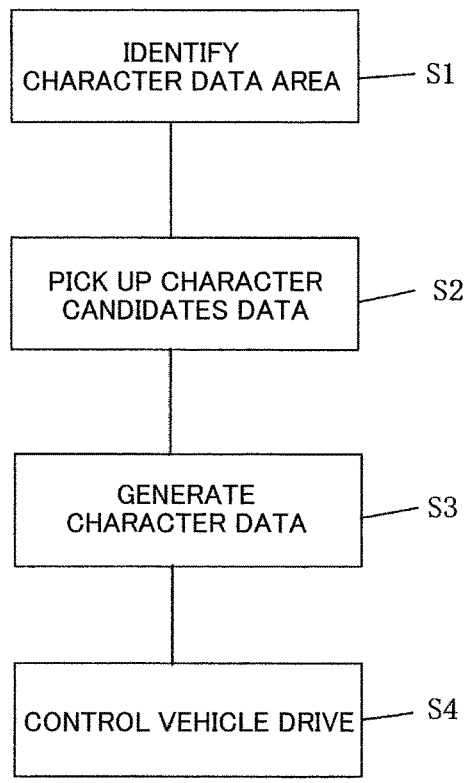
FIG. 6 is a flow chart illustrating a character recognizing process and a drive controlling process performed by the on-board device in FIG. 1.

FIG. 6 illustrates the process in this situation.

The character recognizer 152 classifies image data for the field of view "a" into character and graphics image areas and identifies characters from the character area (Step S1). The character recognizer 152 matches the identified characters with characters registered in a pattern dictionary to pick up character candidates (Step S2). The character recognizer 152 compares a combination of the character candidates with words in a word dictionary and selects a combination deemed appropriate to generate character data (Step S3). The character recognizer 152 outputs the generated character data.

The vehicle drive controller 155 controls the vehicle drive unit 13 based on the character data (Step S4).

More specifically, the vehicle drive controller 155 determines whether the character data equals the data of a desired stop position number. In the case of a negative result of determination, the vehicle drive controller 155 controls the travelling mechanism (motor) or steering gear of the vehicle drive unit 13 to direct the automated driving vehicle 1 toward a stop plate 31 having another stop position number 31*a*. In the case of an affirmative result of determination, the vehicle drive controller 155 controls the travelling mechanism of the vehicle drive unit 13 to bring the automated driving vehicle 1 closer to the stop plate 31 with the stop position number 31*a*.

(Lane Monitoring Process and Vehicle Drive Controlling Process)

Figure 7:
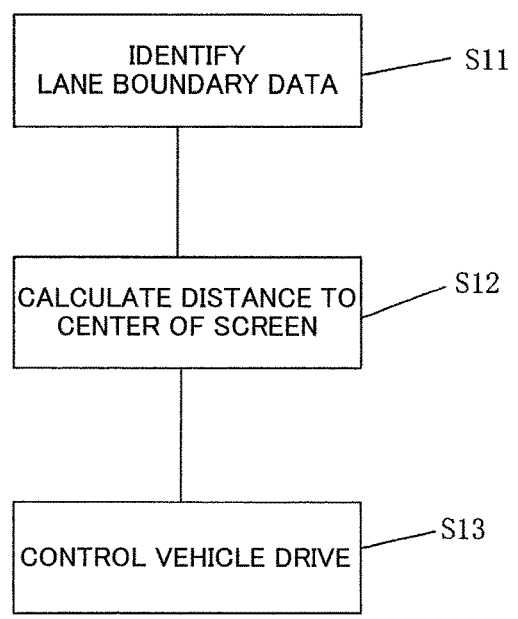
FIG. 7 is a flow chart illustrating a lane monitoring process and a drive controlling process performed by the on-board device in FIG. 1.

FIG. 7 illustrates the process in this situation.

The lane monitor 153 identifies lane boundary data for the lateral lane boundaries 30*a*, 30*a* in the image data for the field of view "b" (Step S11). The lane monitor 153 calculates a horizontal distance from each of the lateral lane boundaries 30*a*, 30*a* to the center of the screen based on the lane boundary data (Step S12). The distance can be obtained by counting the number of pixels in the screen. Alternatively, the screen is pre-divided into small areas having a predetermined number of pixels in the horizontal and vertical directions and the distance may be obtained by counting the number of the small areas. For a prefixed width between the lateral lane boundaries 30*a*, 30*a* the distance from each of the lateral lane boundaries 30*a*, 30*a* to the central axis of the automated driving vehicle 1 can be readily determined by counting the number of the pixels or small areas. The lane monitor 153 outputs the measured distance.

The vehicle drive controller 155 controls the vehicle drive unit 13 based on the measured distance (Step S13).

More specifically, the vehicle drive controller 155 determines, for example, whether the lateral deviation of the vehicle exceeds a threshold. In the case of a negative result of determination, the vehicle drive controller 155 controls the travelling mechanism of the vehicle drive unit 13 to bring the automated driving vehicle 1 closer to the stop plate 31. In the case of an affirmative result of determination, the vehicle drive controller 155 controls the steering gear of the vehicle drive unit 13 to steer the vehicle toward a direction that eliminates the lateral deviation.

Alternatively, the vehicle drive controller 155 may detect an inclination of the lateral lane boundaries 30*a*, 30*a* from the lane boundary data to control the automated driving vehicle 1 so as to produce an appropriate inclination based on the detected inclination.

(Distance Measuring Process and Vehicle Drive Controlling Process)

Figure 8:
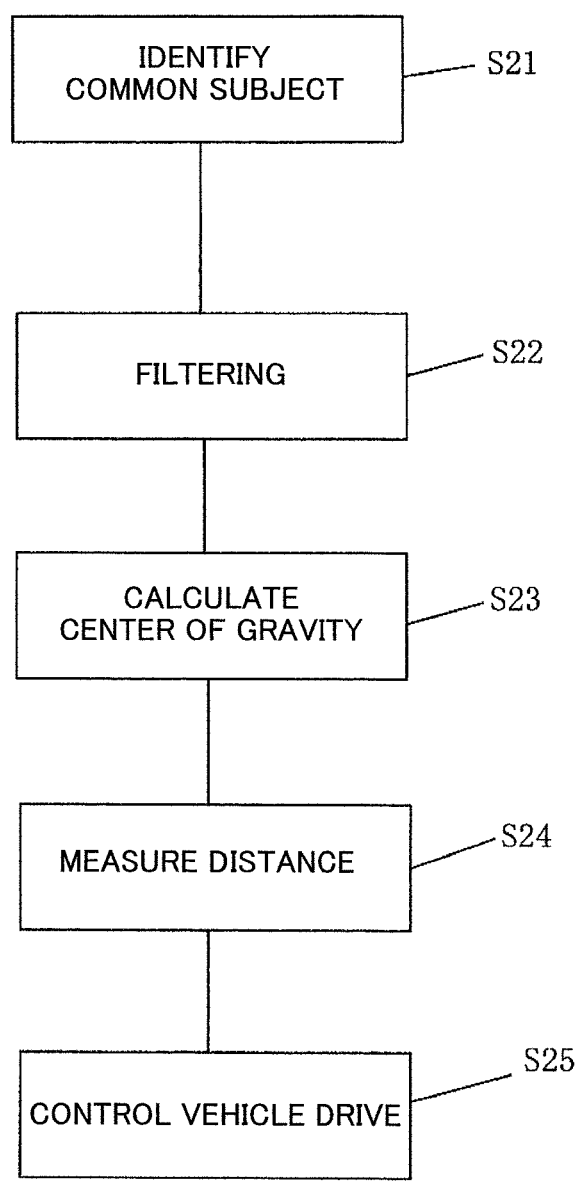
FIG. 8 is a flow chart illustrating a distance measuring process and a drive controlling process performed by the on-board device in FIG. 1.

FIG. 8 illustrates the process in this situation.

The distance meter 154 identifies image data for a common subject (for example, the stop plate 31) in the image data for the field of view "d" (Step S21) and removes noise around the identified image data by filtering (Step S22). The distance meter 154 calculates the center of gravity of the identified image data with a predetermined expression (Step S23). The distance meter 154 calculates and outputs a distance to the center of gravity by a stereo method (Step S24).

FIG. 9 illustrates a perspective projection model relevant to this embodiment. In the perspective projection model, light from a three-dimensional point linearly reaches the center of a lens and a point at which the straight line intersects with an imaging plane is projected on a two-dimensional image. This perspective projection model is used to describe how to measure the distance.

In FIG. 9, the symbol "B" indicates a distance between the centers of the first imager 11 and the second imager 12 (imaging baseline length), the symbol "f1" indicates a focal point distance of the first lens 11*a* of the first imager 11, the symbol "f2" indicates a focal point distance of the second lens 12*a* of the second imager 12, the symbol "P1 (x1, y1)" indicates an image coordinate of the first imager 11, the symbol "P2 (x2, y2)" indicates an image coordinate of the second imager 12, the symbol "P(x, y, z)" indicates a three-dimensional coordinate of a measuring point, and the symbol "20" indicates an object. In brief, the first lens 11*a* and the second lens 12*a* are positioned symmetrically with respect to the central axis of the automated driving vehicle 1 and the origin of the three-dimensional coordinate lies in the middle between the first lens 11*a* of the first imager 11 and the second lens 12*a* of the second imager 12.

The measuring point P(x, y, z) on the object 20, the corresponding points P1 (x1, y1) and P2 (x2, y2) on the screen, and the focal point distances f1, f2 have the following relationship:

$$x=[B\times[x1+(f1\times x2/f2)]]/[2\times[x1-(f1\times x2/f2)]]$$

$$y=(y1\times B)/[x1-(f1\times x2/f2)]$$

$$z=(f1\times B)/[x1-(f1\times x2/f2)]$$

The position coordinate (x, y, z) of the measuring point of the object 20 and the distance z to the measuring point can be determined with these expressions.

The coordinates of the P1 (x1, y1) and the P2 (x2, y2) can be determined by counting the number of pixels or the number of small areas having a predetermined number of pixels in the horizontal and vertical directions on the screens of the first imager 11 and the second imager 12. The number of pixels or small areas counted on the screen of the second imager 12 should be converted into that counted on the screen of the first imager 11 because the screen of the second imager 12, which is clipped, is smaller than that of the first imager 11.

Once the distance to the measuring point is determined, the vehicle drive controller 155 controls the vehicle drive unit 13 in accordance with the measured distance (Step S25).

More specifically, the vehicle drive controller 155 controls the travelling mechanism (the motor or brake) of the vehicle drive unit 13 in consideration of the distance to the stop plate 31 and the vehicle speed to bring the automated driving vehicle 1 closer to a desired stop plate 31 and stop it.

The embodiment of the present invention has been described, but the present invention is not limited to this embodiment, and various changes may be made without departing from the scope of the invention.

For example, in the above embodiment, the first imager 11 and the second imager 12 are positioned substantially parallel to each other at the same level. Alternatively, they may have any other positional relation. For example, they may be positioned such that the axis of the first imager 11 intersects with that of the second imager 12. The axis of the first imager 11 may be at a different level from that of the second imager 12.

In the above embodiment, the image data acquirer 151 binarizes image data from the first imager 11 and from the second imager 12. Instead, such binarization may be performed by the image sensors 11b, 12b, the character recognizer 152, the clipper 151a, the lane monitor 153, or the distance meter 154.

In the above embodiment, the imaging device is mounted on an automated driving vehicle. The device can also be mounted on a robot.

In the above embodiment, the image data for the field of view "c" is acquired from the image data for the field of view "b" and then a pair of image data having parallax for the field of view "d" is acquired using the image data for the field of view "a" and the image data for the field of view "c". The pair of image data having parallax for the field of view "d" may be directly acquired from the image data for the field of view "a" and the image data for the field of view "b".

What is claimed is:

1. An imaging device comprising:
   a first imaging section including a first lens, wherein the first imaging section is configured to capture a range of a first field of view;
   a second imaging section including a second lens, the second lens having an angle of view wider than the first lens, and the second imaging section having a lower definition than the first imaging section, wherein the second imaging section is configured to capture a range of a second field of view which includes the range of the first field of view and is wider than the range of the first field of view; and
   a controller which is configured to perform operations including:
   acquiring first image data of a subject captured by the first imaging section, and second image data of the subject captured by the second imaging section,
   clipping, from the second image data, clipped image data that has a same angle of view as the range of the first field of view and which has an imaging range partially in common with the first field of view in the first image data,
   generating corrected data in which a number of pixels of the clipped image data is corrected to have a number of pixels corresponding to a number of pixels of the first image data, and
   generating, from the first image data and the corrected data, image data of a three-dimensional field of view with a range that is narrower than ranges of the first image data and the corrected data.

2. The imaging device according to claim 1, further comprising a distance meter that determines a distance to the subject based on the image data of the three-dimensional field of view.

3. The imaging device according to claim 1, wherein an optical axis of the first imaging section and an optical axis of the second imaging section are positioned substantially parallel to each other at the same level.

4. The imaging device according to claim 1, further comprising a character recognizing section that recognizes a character in the first image data of the subject captured by the first imaging section.

5. The imaging device according to claim 1, wherein the angle of view of the second lens includes the angle of view of the first lens.

6. An imaging method performed by an imaging device, the imaging method comprising:
   acquiring first image data of a subject, the first image data being captured by a first imaging section having a first lens, wherein the first imaging section is configured to capture a range of a first field of view;
   acquiring second image data of the subject, the second image data being captured by a second imaging section having a second lens, the second lens having a wider angle of view than the first lens, and the second imaging section having a lower definition than the first imaging section, wherein the second imaging section is configured to capture a range of a second field of view which includes the range of the first field of view and is wider than the range of the first field of view;
   clipping, from the second image data, clipped image data that has a same angle of view as the range of the first field of view and which has an imaging range partially in common with the first field of view in the first image data;
   generating corrected data in which a number of pixels of the clipped image data is corrected to have a number of pixels corresponding to a number of pixels of the first image data; and
   generating, from the first image data and the corrected data, image data of a three-dimensional field of view with a range that is narrower than ranges of the first image data and the corrected data.

7. A non-transitory computer-readable recording medium containing a program for controlling a computer to implement an imaging method in an imaging device, the program being executable by the computer to control the computer to execute functions comprising:
acquiring first image data of a subject, the first image data being captured by a first imaging section having a first lens, wherein the first imaging section is configured to capture a range of a first field of view;
acquiring second image data of the subject, the second image data being captured by a second imaging section having a second lens, the second lens having a wider angle of view than the first lens, and the second imaging section having a lower definition than the first imaging section, wherein the second imaging section is configured to capture a range of a second field of view which includes the range of the first field of view and is wider than the range of the first field of view;
clipping, from the second image data, clipped image data that has a same angle of view as the range of the first field of view and which has an imaging range partially in common with the first field of view in the first image data;
generating corrected data in which a number of pixels of the clipped image data is corrected to have a number of pixels corresponding to a number of pixels of the first image data; and
generating, from the first image data and the corrected data, image data of a three-dimensional field of view with a range that is narrower than ranges of the first image data and the corrected data.

8. The imaging device according to claim 1, wherein the controller is a processor which executes functions of an automated driving vehicle; and
wherein the imaging device further comprises a recorder in which programs and data to control the processor to execute the functions are stored in advance and updated, or are temporarily stored for each function executed by the processor.

9. The imaging device according to claim 8, wherein the processor concurrently or selectively retrieves image data from the first imaging section or the second imaging section.

10. The imaging device according to claim 9, wherein the operations performed by the controller further comprise binarizing the image data retrieved from the first imaging section and the second imaging section and acquires the binarized image data.

11. The imaging device according to claim 9, wherein the operations performed by the controller further comprise recognizing character data included in the image data retrieved from the first imaging section, recognizing a parking position number displayed on a stop plate located at a position at which the automated driving vehicle should stop, and recognizing a traffic sign or any other character.

12. The imaging device according to claim 9, wherein the operations performed by the controller further comprise monitoring a lane of the automated driving vehicle based on the image data retrieved from the second imaging section and monitoring a lateral deviation of the automated driving vehicle while in operation or an obstacle on a right or left side of the automated driving vehicle while in operation.

13. The imaging device according to claim 9, wherein the operations performed by the controller further comprise calculating a position of the subject or a distance to the subject based on the image data of the three-dimensional field of view.

14. The imaging device according to claim 8, wherein the operations performed by the controller further comprise generating a vehicle drive control signal based on at least one of recognized characters, monitored lanes, and a measured distance so as to control driving of the automated driving vehicle.

15. The imaging device according to claim 1, wherein:
a field of view of the first lens is a high-definition field of view, a field of view of the second lens is a wide-angle field of view, a field of view obtained by clipping the field of view of the second lens is a clipping field of view, and a field of view in common between the high-definition field of view and the clipping field of view is the three-dimensional field of view; and
the image data of the three-dimensional field of view comprises image data captured by the first imaging section and the second imaging section and corresponding to the three-dimensional field of view.

16. An automated driving vehicle comprising the imaging device according to claim 1.

17. A robot comprising the imaging device according to claim 1.

* * * * *